(12) United States Patent
Smith

(10) Patent No.: US 9,453,905 B2
(45) Date of Patent: Sep. 27, 2016

(54) GEOLOCATION

(71) Applicant: ZIVA CORPORATION, San Diego, CA (US)

(72) Inventor: David Smith, Ellicott City, MD (US)

(73) Assignee: ZIVA CORPORATION, San Diego, CA (US)

( * ) Notice: Subject to any disclaimer, the term of this patent is extended or adjusted under 35 U.S.C. 154(b) by 777 days.

(21) Appl. No.: 13/738,548

(22) Filed: Jan. 10, 2013

(65) Prior Publication Data

US 2014/0022128 A1    Jan. 23, 2014

Related U.S. Application Data

(60) Provisional application No. 61/586,675, filed on Jan. 13, 2012, provisional application No. 61/597,492, filed on Feb. 10, 2012.

(51) Int. Cl.
*G01S 3/02* (2006.01)
*G01S 5/02* (2010.01)

(52) U.S. Cl.
CPC .................................. *G01S 5/0273* (2013.01)

(58) Field of Classification Search
USPC ...... 342/442, 445, 463, 465; 455/456.4, 457
See application file for complete search history.

(56) References Cited

U.S. PATENT DOCUMENTS

| 3,659,085 A | 4/1972 | Potter et al. |
| 6,414,634 B1 | 7/2002 | Tekinay |
| 2004/0127228 A1 | 7/2004 | You et al. |
| 2005/0219115 A1 | 10/2005 | Herberthson |
| 2008/0198072 A1 | 8/2008 | Elwell et al. |
| 2014/0126567 A1* | 5/2014 | Husain et al. ................ 370/350 |

OTHER PUBLICATIONS

Roehrig et al. "Indoor Location Tracking in Non-line-of-Sight Environments Using a IEEE 802.15 4a Wireless Network," In: IEEE/RSJ International Conference on Intelligent Robots and Systems, Oct. 10-15, 2009, pp. 552-557, Retrieved from the Internet <URL: http://www.fh-dortmund.de/de/studi/fb/4/einrichtungen/laboratorien/imsl/Publikationen/pdf/iros09.pdf>.

(Continued)

*Primary Examiner* — Dao Phan
(74) *Attorney, Agent, or Firm* — Anatoly S. Weiser, Esq.; TechLaw LLP

(57) ABSTRACT

In selected embodiments, a process of geolocation of a transmitter uses a receiver with an antenna array that is non-line-of-sight (NLoS) to the transmitter. A first plurality of scatterers within line-of-sight (LoS) of the array is located using multilateration based on time difference of arrival (TDoA) from the first scatterers, and applying a spatial consistency requirement. Time of emission/reflection from the first scatterers is also determined. The coordinates and timing of the first scatterers are used to locate either the transmitter or another set of scatterers, by applying multilateration to the TDoA at the first scatterers, and applying the spatial consistency requirement. The process is iteratively repeated until the transmitter is identified. The multilateration may be linearized without sacrificing precision. In each iteration, a non-singularity requirement is applied to ensure that the selected scatterers produce unambiguous results.

17 Claims, 14 Drawing Sheets

(56) References Cited

OTHER PUBLICATIONS

Citation Roehrig et al. "Indoor Location Tracking in Non-line-of-Sight Environments Using a IEEE 802.15 4a Wireless Network," In: IEEE/RSJ International Conference on Intelligent Robots and Systems, Oct. 10-15, 2009, pp. 552-557, Retrieved from the Internet <URL:http://ieeexplore.ieee.org/xpl/login.jsp?tp=&arnumber=5354747&url=http%3A%2F%2Fieeexplore.ieee.org%2Fxpls%2Fabs_all.jsp%3Farnumber%3D5354747>.

Thomas, "Techniques for Mobile Location Estimation in UMTS", Website dated Dec. 2001; PDF dated Oct. 2001, Thesis, all pages.

Scheuing et al., "Disambiguation of TDOA Estimation for Multiple Sources in Reverberant Environments." In: IEEE Transactions on Audio, Speech, and Language Processing, vol. 16, No. 8, Nov. 2008, pp. 1479-1489.

Zhu et al. "Non-line-of-sight error mitigating algorithm based on scattering models via multi-antenna system." In: The Journal of China Universities of Posts and Telecommunications, vol. 15, issue 1, Mar. 2008, pp. 18-22.

Dizdarevic et al. "On Impact of Topology and Cost Function on LSE Position Determination in Wireless Networks." In: Proceedings of the 3rd Workshop on Positioning, Navigation and Communicaation 2006 (WPNC'06), pp. 129-138.

Chan et al. "Time-of-Arrival Based Localization Under NLOS Conditions." In: IEEE Transactions on Vehicular Technology, vol. 55, No. 1, Jan. 2006, pp. 17-24.

Bahillo et al. "Indoor Location Based on IEEE 802.11 Round-Trip Time Measurements With Two-Step NLOS Mitigation" In: Progress in Electromagnetics Research B, vol. 15, 2009, pp. 285-306.

ZIVA Corporation, International Search Report from International Application No. PCT/US13/21125, dated Apr. 8, 2013, all pages.

Ebrahimian Z et al: "Source Localization using Reflection Omission in the Near-Field", Wireless Communications and Applied Computational Electromagnetics, 20 05. IEEE/ACES International Conference on Honolulu, HI Apr. 3-7, 2005, Piscataway, NJ, USA. IEEE, Apr. 3, 2005 (Apr. 3, 2005), pp. 13-16. XP010826450, DOI: 10.1109/WCACEM.2005.1469517 ISBN: 978-0-7803-9068-3.

Shi Mingtang et al: "A Distributed Multi-Antenna Based NLOS Error Elimination Algorithm for Mobile Localization", Circuits and Systems for Communications, 2008. ICCSC 2008. 4TH IEEE International Conference on, IEEE, Piscataway, NJ, USA, May 26, 2008 (May 26, 2008). pp. 411-415, XP031268728, ISBN: 978-1-4244-1707-0.

Huang J Y et al: "Calculation of mobile location based on quadratic reflection model", Signal Processing and Its Applications, 2007. ISSPA 2007. 9TH International Symposium on, IEEE, Piscataway, NJ USA, Feb. 12, 2007 (Feb. 12, 2007), pp. 1-3, XP031280466, ISBN: 978-1-4244-0778-1.

Friedlander B: "A passive localization algorithm and its accuracy analysis", IEEE Journal of Oceanic Engineering, IEEE Service Center, Piscataway, NJ, US, vol. 12, No. 1, Jan. 1, 1987 (Jan. 1, 1987), pp. 234-245, XP011290798, ISSN: 0364-9059.

Supplemental European Search Report mailed on Jun. 29, 2016 and received in connection with corresponding European Patent Application No. 13735652.3, all pages.

\* cited by examiner

GEOLOCATION

CROSS-REFERENCE TO RELATED APPLICATIONS

The present application claims priority from U.S. Provisional Patent Application Ser. No. 61/586,675, entitled GEOLOCATION, filed on 13 Jan. 2012; and from U.S. Provisional Patent Application Ser. No. 61/597,492, entitled GEOLOCATION, filed on 10 Feb. 2012. Each of the above-referenced patent documents is hereby incorporated by reference in its entirety as if fully set forth herein, including text, figures, claims, tables, computer program listing appendices, matter incorporated by reference in the patent document, and all other matter in the document.

FIELD OF THE INVENTION

This document is related to the field of tracking of transmission sources and other objects, and geolocation, including self-location. Selected disclosed embodiments relate to apparatus, methods, and articles of manufacture for passive and active geolocation of transmission sources in various environments, including, without limitation, environments with severe multipath and non-line-of-sight (NLoS) geometries without detectable or easily identifiable line-of-sight (LoS) signal component. Selected disclosed embodiments relate to apparatus, methods, and articles of manufacture for positioning, such as positioning performed by satellite-based global positioning systems.

BACKGROUND

Geolocation is a term that describes a broad range of technologies for deriving the spatial location (e.g., X, Y, Z Cartesian coordinates) of an object by processing transmitted signals that are received, emitted, or reflected by that object. While in selected embodiments described in this document and illustrated in the attached drawings the transmitted signals are radio frequency (RF) signals, geolocation and selected principles described here may be extended to other transmitted signals, including sound/ultrasound signals.

Known geolocation examples include the Global Positioning Satellite (GPS) systems and cell phone networks, but other RF geolocation systems may be used in areas as diverse as inventory management, asset tracking, law enforcement, and the military. There are several different modes of operation of these systems. For example, the GPS systems attempt to enable an object to geolocate its own position by reading RF signals emitted by multiple satellites. The RF signals contain precise information about the location of the satellites and the time of emission of the signals. The object can acquire the signals from the multiple satellites, read the data contained in the signals, use standard multilateration techniques to calculate the coordinates of the object's position relative to the satellites, and project the coordinates onto pre-defined references, such as maps. (Multilateration techniques are based on the measurement of the difference in distance from the located object to two or more stations at known locations that broadcast at known times.) For example, the coordinates may be used by a vehicle's software to indicate the position of the vehicle on a map, and to map a path to another set of coordinates.

Cellular telephone systems may also perform geolocation. In this case, however, a cell phone can geolocate its position by using data acquired from cell towers in a manner similar to that used by the GPS systems. In the cell systems, the technique can also be used in reverse, where the cell network geolocates the cell phone using signals received by multiple cell towers from the cell phone. This technique is often used by law enforcement to track individuals.

Similar techniques can be used in inventory management where radio frequency identifier (RFID) tags can emit signals which can be, e.g., triangulated by antenna arrays placed around warehouses or in locations like docks and shipping holds.

In the above-described cases, the geolocation may be achieved by a combination of geometrical calculations, such as triangulation, trilateration, or multilateration and acquiring critical transmission data by reading key information embedded in the signals by the transmission source or some other part of the system. For example, the GPS system embeds in the signal highly precise information about the X, Y, Z coordinates of the satellites and the signal emission times (ephemeris data). If this data can be read on a precise receiver that has the same time reference as the satellite time reference, the distances from the receiver to the satellites can be calculated. The receiver's location can then be determined through trilateration.

It is more problematic to geolocate through derivation of the critical spatial parameters of a source without being able to read the information content of the source's signal. The process of geolocation based on the ability to detect the signal at the physical layer is more general and does not necessarily require receivers with special properties or a functioning sophisticated infrastructure like the GPS systems or the cellular telephone systems.

Techniques that perform geolocation based on the physical layer detection of the signals generally attempt to look at one or more properties of the signal, and measure how these properties change as function(s) of some spatial variable(s). A large dish antenna, for example, can be rotated until the received signal is maximized in a particular direction. This provides direction of arrival (DoA) information. If the result from one antenna is compared with similar results taken from additional, spatially diverse antennas/locations, triangulation may reveal the apparent source of the signal. Similarly, using the time difference of arrival (TDoA) of signals between or among multiple antennas at different known locations, the antenna array can be employed to geolocate a source by using the time of arrival to estimate the sides of the triangles rather than the angles, and perform trilateration as opposed to triangulation. Analogous techniques can be used by employing other signal properties, such as detected signal strength (DSS).

In general, it is necessary to observe the signals from more than one location and to compare the results obtained at the different locations. In practice this may be done by placing different antennas at the various locations. It may also be done by moving a single antenna to the different locations and comparing sequential measurements. Either the receiver or the transmitter, or both end points can be moving or stationary, and the mobility may take place independent of the geolocation process or be part of the geolocation process. In other words, the mobility may be used as part of the geolocation process to search for the source, or it may result from moving objects attempting to geolocate themselves in order to determine their location and/or trajectory. The former mobility may enhance the accuracy of geolocation, the latter may degrade geolocation accuracy by placing strict time limits on how rapidly the process must be performed. This may eliminate the ability to use more computationally complex methodologies.

Spatial correlation and spatial diversity are generally the principles underlying such techniques. Spatial correlation refers to the concept that if the properties of a source which is emitting a signal are known, as are the details of the environment through which the signal is propagating, the field of the signal is fully determined (defined) at all points in space.

Spatial diversity, in the context of geolocation, usually refers to the ability to measure properties of the field at different points in space and from these to determine the degree of spatial correlation of the field. Spatial correlation refers to the ability to predict certain properties of a signal emitted into a known spatial environment at various locations in the environment. To illustrate spatial diversity (as the concept applies to geolocation), comparing measurements of signal properties taken at multiple points in space in a highly spatially correlated field can be used to calculate the location of the source of the signal. In general, if a source emits a signal, and the signal at a sufficient number of points in space is measured (adequate spatial diversity), then if the signal is spatially well-correlated, the location of the source may be inferred from the inherent structure of the field.

In reality, all fields are spatially correlated since propagation of EM waves is fully deterministic. Since an observer in practice may not know the specific details of the environment through which a signal propagates, however, then spatial correlation becomes a measure of the observer's knowledge of the environment and computational ability to predict the field. Hence, if the environment is unknown, the spatial correlation degrades and becomes significantly less than perfect and the observer loses the ability to deduce the location of the source by making spatially diverse measurements of the field.

If either of these properties (spatial correlation and spatial diversity) is degraded, the accuracy of the geolocation may suffer and in some cases geolocation may become impossible with conventional techniques. Spatial correlation is primarily degraded when there are unknown elements in the propagation environment that corrupt the signal, such as multipath scattering and structures that attenuate the signal or cause dispersion. A particularly serious degradation may occur when there is no LoS signal to the observer locations. In that case, the signal may only reach the observer by following a multipath scattering route and hence the processes that use triangulation or multilateration generally fail to provide an acceptable position estimate. Spatial diversity is usually degraded by using too few antenna locations or by having the diverse locations too close together to resolve the signal differences. This can result in the failure of the geolocation process.

Noise, interference, and poor measurement techniques may also degrade the received signal and reduce the quality of geolocation. When these problems create a reduction of the accuracy of the geolocation, but the source location remains at some statistical center, we refer to a degradation of "accuracy." If this degradation of accuracy is caused by measurement noise whose statistical properties are known, then it may be possible to use statistical estimation theory to recover the mean location of the signal and improve the accuracy. This may be equivalent, for example, to providing an observer with many measurement results spread over a large area, and informing the observer that the results follow a Gaussian (or other known) distribution. The observer can then estimate the true location to be at the center of the Gaussian peak, resulting in a highly accurate geolocation, even though the results may be widely spread out. In reality, the statistics may not be known sufficiently well, and so the accuracy error can be reduced only to the Cramer-Rao limit known from the statistical estimation theory. The magnitude of accuracy errors based on noise typically scales with the actual distance between the source and the observer.

When there is no detectable LoS signal, the statistical estimation technique often appears to reduce the effect of the accuracy errors such as measurement noise, but the final solution may be at the wrong location, often very far from the correct location. In practice, the solution often geolocates the strongest LoS scatterer in the field, instead of the original transmission source. This is a serious form of error, called a bias error, and it may occur when one attempts to perform triangulation or multilateration without having at least a weak (but detectable) LoS signal to provide spatial correlation. Consequently, conventional state-of-the-art systems apply many sophisticated techniques to ensure that effects like multipath scattering do not degrade the ability to recover even weak LoS signal components, or that they use the NLoS components to infer the LoS.

Hence, although some examples in the scientific literature refer to NLoS geolocation, they generally do not literally mean geolocating in perfect NLoS conditions, i.e., without a detectable LoS signal. Instead, they typically mean recovering weak LoS signals that are swamped with multipath (NLoS signals) or using a-priori knowledge of the geometrical obstacles that are blocking the signal to infer the actual LoS path, or estimating the maximum error of the location by placing bounds on how far the hidden LoS component can deviate from the visible NLoS signal. These techniques may not work well for deeply hidden sources in what is referred to as multi-hop or "true" NLoS conditions.

The conventional technique used to obtain geolocation information in severe multi-hop NLoS cases is to use a mobile observer who can follow the signal round the corners. This is similar to how a person can locate misplaced objects, such as car keys or a wallet, by activating a small acoustic beeper attached to the objects and following the sound until they are found. Such techniques, however, are not generally applicable, have serious security and safety limitations, and are not physically possible in many circumstances.

Finally, there are variations in how the signals required to geolocate an object are created. In some cases the object itself may be emitting the RF signal. For example, the military authorities are interested in the ability to geolocate insurgents activating roadside bombs with cell phones. Other cases, such as GPS system applications, include multiple satellites emitting signals, while the object to be geolocated is passively observing the signals. In other cases, an observer may actively "ping" the environment, attempting to observe reflections from an object of interest and geolocate the object. Still other techniques may use an independent beacon to illuminate a target and attempt geolocation by observing reflections from the target. Other approaches are possible.

In general, the various applications of geolocation include the following:

Using a passive spatially diverse array to geolocate an active source;

Using an active spatially diverse array to geolocate a passive source;

Performing self-geolocation by observing the spatially diverse emissions of an active array;

Performing self-geolocation by using a passive array to detect signals emitted by an active source (active beacon); and Performing self-geolocation using an active array to reflect signals from a passive source reflector (a passive beacon).

Needs in the art exist for better geolocation techniques, including techniques capable of true NLoS geolocation.

SUMMARY

Selected embodiments described in this document enable a transmission source to be geolocated in a true NLoS environment where the signal reaching the observer from the transmission source does so as a result of multipath reflections from scatterers, where information about the location of the various scatterers responsible for reflecting the signal is not known a priori, and knowledge of how the source is spatially related to the scatterers is also not available a priori. In particular embodiments, only the physical layer detection of the signal is used, without requiring the ability to read information from the signal. Some embodiments work in LoS situations successfully managed by existing technology, and also extend to NLoS cases. The described techniques may provide solutions for NLoS geolocation by stationary observers (e.g., static listening posts used by the intelligence services or military or law enforcement stations), without a requirement for deployed infrastructures such as distributed sensor nets. The techniques also work in LoS and improve geolocation generally, including in both mobile and static cases, and do not necessarily require the observer to change to different methodologies or techniques when faced with difficult NLoS in severe multipath environments.

In selected embodiments, the described techniques may improve performance as the amount of multipath increases and consequently constitute a paradigm shift compared to previously known geolocation techniques, which generally degrade with multipath and consequently may not be useful in severe multipath environments such as ships or metallic hangers and other metallic storage areas.

Some embodiments use a simple linearized (linear) algorithm to calculate the geolocation results, consequently speeding up possible computational solutions, since they do not require non-linear estimation techniques and iterative processes to resolve the solution. The linear algorithm may incorporate a simple metric that indicates when the antenna geometry does not have the required spatial diversity to perform the geolocation, and may also provide the information required for the user to correct this deficiency.

In embodiments, the linear algorithm is employed to identify the LoS scatterers, and estimate not only their locations, but also the time of emission from these LoS scatterers. The results from the LoS scatterers are then used to estimate location of the source transmitter, if the source transmitter is in the LoS of the scatterers previously identified. If the identified scatterers are not within the LoS of the source transmitter, the step can be successively repeated to obtain location and timing estimates for a second set of scatterers, eventually obtaining the location/timing estimates for scatterers within the LoS of the source transmitter. From the latter information, the location of the source transmitter is estimated.

In cases where the receiving antenna array is not within the LoS of the transmitter, but at least one scatterer is within LoS of both the antenna array and the source transmitter, the location(s) of the at least one scatterer may be estimated together with the time(s) of emission from the at least one scatterer. The location of the source transmitter may then be estimated based on the location and timing information relating to the at least one scatterer. In this way, the multipath information is used—instead of being suppressed. In a sense, the scatterers are used as virtual receiver antenna elements.

Selected described embodiments employ techniques for geolocating a transmission source to improve positioning system operation in environments with impaired or no direct line-of-sight between a positioning system receiver and one or more satellites (or other transmitters used for self-geolocation).

These and other features and aspects of selected embodiments not inconsistent with the present invention will be better understood with reference to the following description, drawings, and appended claims.

DETAILED DESCRIPTION

Figure 1:
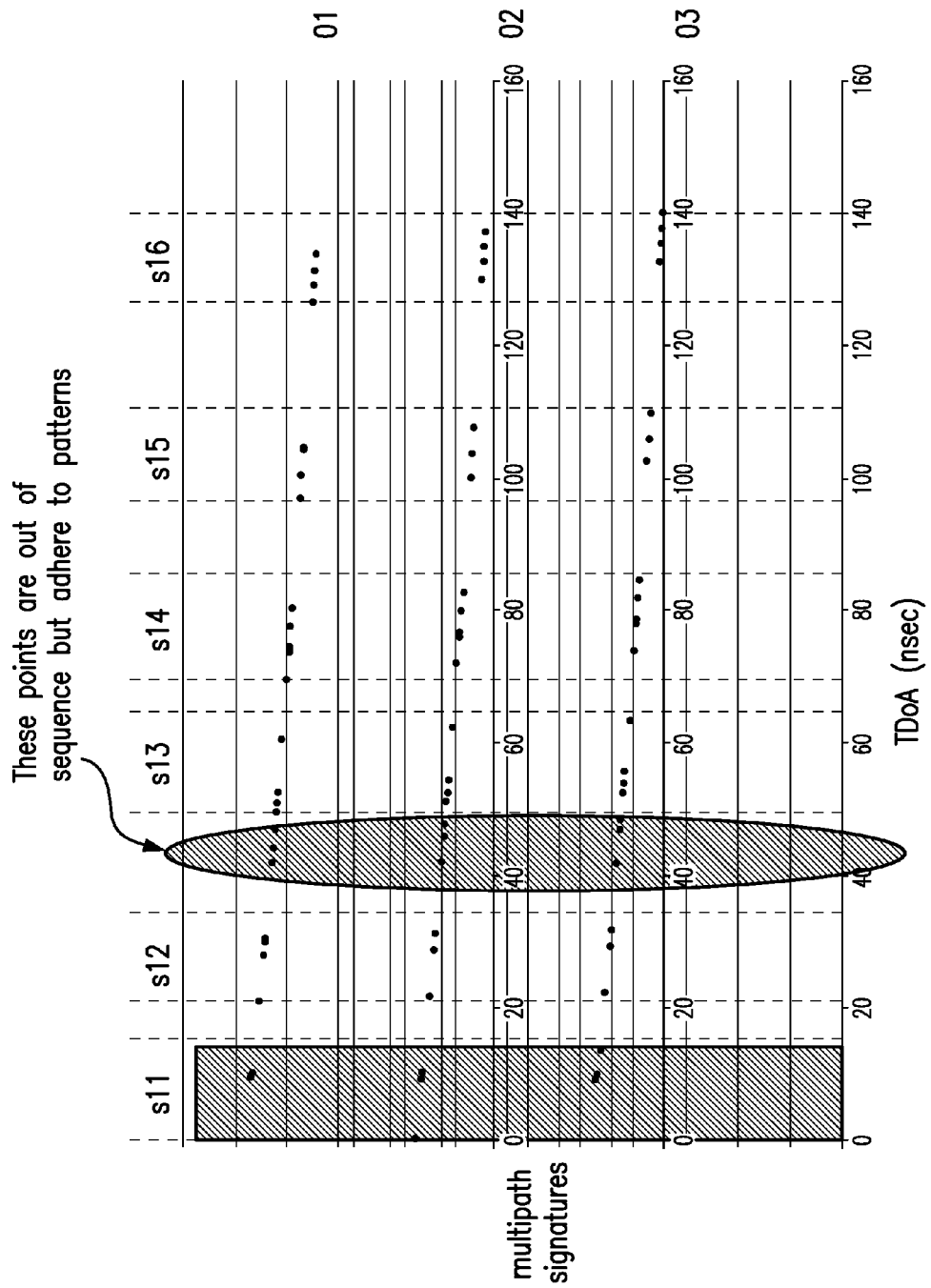
FIG. 1 illustrates an example of multipath signatures observed on three antennas.

In this document, the words "embodiment," "variant," "example," and similar words and expressions refer to a particular apparatus, process, or article of manufacture, and not necessarily to the same apparatus, process, or article of manufacture. (The word "example" may also refer to a real or simulated setting.) Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning both direct/immediate connections and connections through mediate elements.

The expression "processing logic" should be understood as selected steps and decision blocks and/or hardware for implementing the selected steps and decision blocks. "Decision block" means a step in which a decision is made based on some condition, and process flow may be altered based on whether the condition is met or not met.

"Multilateration" refers to a technique for navigating or geolocating an object based on the measurement of the difference in distance or time-of-flight from the object to two or more stations at known locations that broadcast signals at known times. Measuring the difference in distance results in an infinite number of locations that satisfy the measurement condition. When these possible locations are plotted, they form a hyperbolic curve. To locate the exact location along that curve, a second measurement is taken to a different pair of stations, to generate a second curve, which intersects with the first. When the two are compared, a small number of possible locations result. In comparison, trilateration uses distances or absolute measurements of time-of-flight from three or more sites; and triangulation uses the measurement of absolute angles.

Other and further explicit and implicit definitions and clarifications of definitions may be found throughout this document.

Reference will be made in detail to one or more embodiments (apparatus, methods, and/or articles of manufacture) that are illustrated in the accompanying drawings. Same reference numerals may be used in the drawings and this description to refer to the same apparatus elements and method steps. The drawings may be in a simplified form, not to scale, and may omit apparatus elements and method steps that can be added to the described systems and methods, while possibly including optional elements and/or steps.

For the purposes of this description, a scenario with a single static source and an observer is assumed; the described techniques can be extended to geolocation of multiple sources. It is also assumed that the observer has the ability to deploy multiple antennas at different locations, or move a single antenna to different locations, and that the observer is capable of measuring the location (e.g., the X, Y, Z coordinates) of each of the antennas. The antennas are referred to as the "observer array." Another assumption is that the antennas/receivers are capable of measuring the time of arrival of the incoming signals, and the apparatus is capable of calculating the TDoA of the signals across the multiple antennas. Alternatively, other signal properties at the antennas may be measured, for example, direction of arrival, polarization, or signal strength. The present description focuses on time of arrival of the signals, but this technique may be applied to systems that measure different signal properties as long as these properties are deterministically related to the spatial locations of the transmission source, the observer array, and the scatterers. A further assumption is that the system can operate at any frequency and bandwidth, although there may be practical limitations if the bandwidth is so low that the time of arrival of the incoming signals cannot be resolved with the required accuracy. In some instances, it can be assumed that the observer has none of the technical limits on equipment that would be typical for the channel users. For example, in a low bandwidth system, it can typically be assumed that the intended receiver uses a matching low bandwidth receiver to minimize noise, but it would also be assumed that the observer is not limited to such a low receiver bandwidth since the observer may need a higher bandwidth to accurately measure the time of arrival (ToA) of the multipath signatures. It can also be assumed that various deconvolution techniques for enhanced accuracy of ToA measurements of signals may be utilized to improve accuracy in low bandwidth cases. In particular these may be very effective if the pulse shape and other properties of the source pulse are known with high accuracy.

In an example, a signal travelling between a transmission source and the observer in an NLoS channel is divided into a series of LoS steps. To do this, the information contained in the multipath signature reaching the observer array is retained and utilized. In an NLoS channel, if a signal reaches the observer array, it must have reflected from scatterers in the path and some of these scatterers must have LoS to the observer. In embodiments, the multipath signature on each element of the observer array is first deconvolved into a Channel Impulse Response (CIR) and the ToAs of the various multipath echoes are acquired. Other techniques that enable an accurate measurement of the arrival time of the multipath echoes may also be used. It is conventional (but not necessary) to reference these arrival times to t=0, the arrival time of the earliest arriving signal on the array. Since it is assumed that each LoS scatterer will multicast its signal to each of the elements in the observer array, it can be determined which of the multipath echoes on each array element is associated with each of the scatterers. A Spatial Consistency Algorithm, which is more fully described later, may be used for this purpose. This algorithm identifies patterns in the arrival times of the multipath echoes across the antennas that can only result from the signatures being reflected from identical LoS scatterers and consequently allows assignment of groups of multipath echoes to discrete scatterers.

An example of this is shown in the diagram of FIG. 1, which shows multipath signatures observed on 3 antennas, O1, O2, and O3. Each dot on the diagram represents a multipath echo on a particular antenna and the arrival time can be read from the horizontal axis. The amplitudes of the signals are represented by the location of the dots on the vertical axis. (Amplitude information may not be required for the technique described below.) The labels s11-s16 represent six scatterers that have LoS visibility to the observer array and any dot lying inside the vertical dotted lines associated with each scatterer represents an echo that was reflected from that particular scatterer.

A first geolocation stage of the LoS scatterers can be performed using a multilateration algorithm. In this stage, the receiver of the observer performs geolocation to determine (1) the coordinates of the LoS scatterers (scatterers in the line-of-sight of the receiver antennas), and (2) the times T of emission (reflection) from each of these scatterers, of the signals from those scatterers are acquired. The coordinates of the LoS scatterers may be derived by applying multilateration to the TDoA information across the antenna array, and the timing information can be derived from the actual timing of the echoes and the distances from the LoS scatterers and the antennas.

Viewed from the perspective of these scatterers, however, the signal was able to reach them, hence they must also see something which appears to be a LoS source. They may in fact have a direct LoS to the source transmitter; alternatively, if they do not have LoS to the source transmitter, they will have a LoS to a second set of scatterers (which analogously will have LoS to the source transmitter or other scatterers). The coordinates of the first set of scatterers enable them to act as a new virtual "observer" array. Also, the calculated emission times T acquired as the output of the first stage, now become the times of arrival for the second stage. The multilateration algorithm is then applied again in the next stage, geolocating the location and timing information (i.e., the coordinates and the times of emission) on the second set of scatterers. This process continues with additional stages, as needed, until the coordinates and timing of the transmission sources are acquired.

Let T represents the time relative to t=0 when it emitted the original signal. Since t=0 may be defined relative to the arrival time of one of the signals on the observer array, the T values associated with the scatterers are typically negative numbers. This simply indicates that the signals were emitted before they arrived at the antenna array.

Through application of this algorithm, the system of the observer (e.g., one or more computerized receivers with antennas) not only geolocates the source transmitter, but may also provide all or some of the geolocation information for every scatterer (or selected scatterers) in the channel through which the signal from the source transmitter traveled to the antenna array of the observer. The system thus possesses the ability to perform bias-free geolocation even in strictly NLoS channels, by systematically rebuilding the spatial correlation that was destroyed by the NLoS/multipath conditions.

Let us now turn to the Spatial Consistency Algorithm mentioned earlier. In a rich scattering environment, the observable channel impulse response (CIR) may be very complex. If we assume that each antenna element views the same scatterers or sources from slightly different angles and distances, however, then there may be certain unique patterns that generally must be followed by the arrival sequences across the antenna array. These can be used to assign different multipath echoes to the scatterer which reflected them to the antenna.

Figure 2:
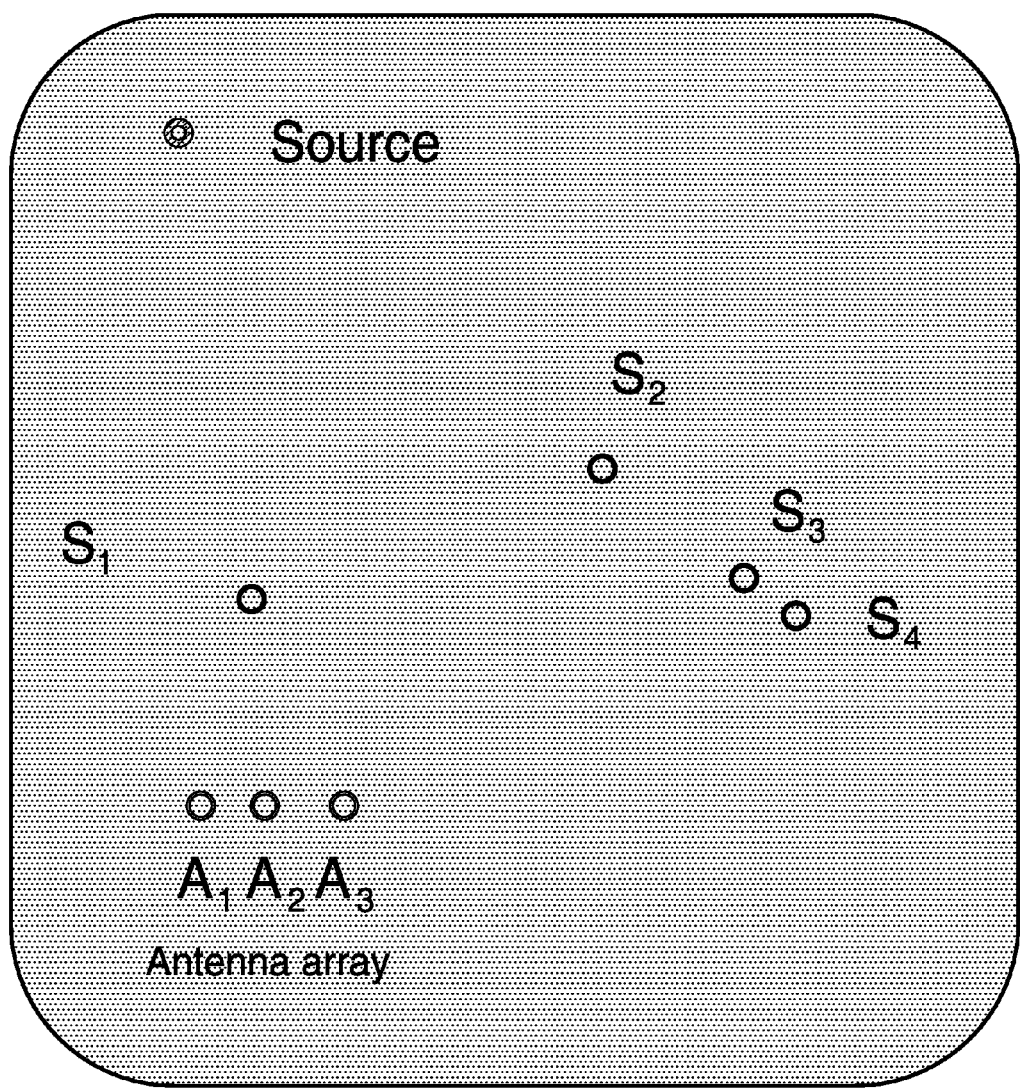
FIGS. 2 and 3 illustrate an example where a source illuminates scatterers that reflect the energy to an antenna array.
Figure 3:
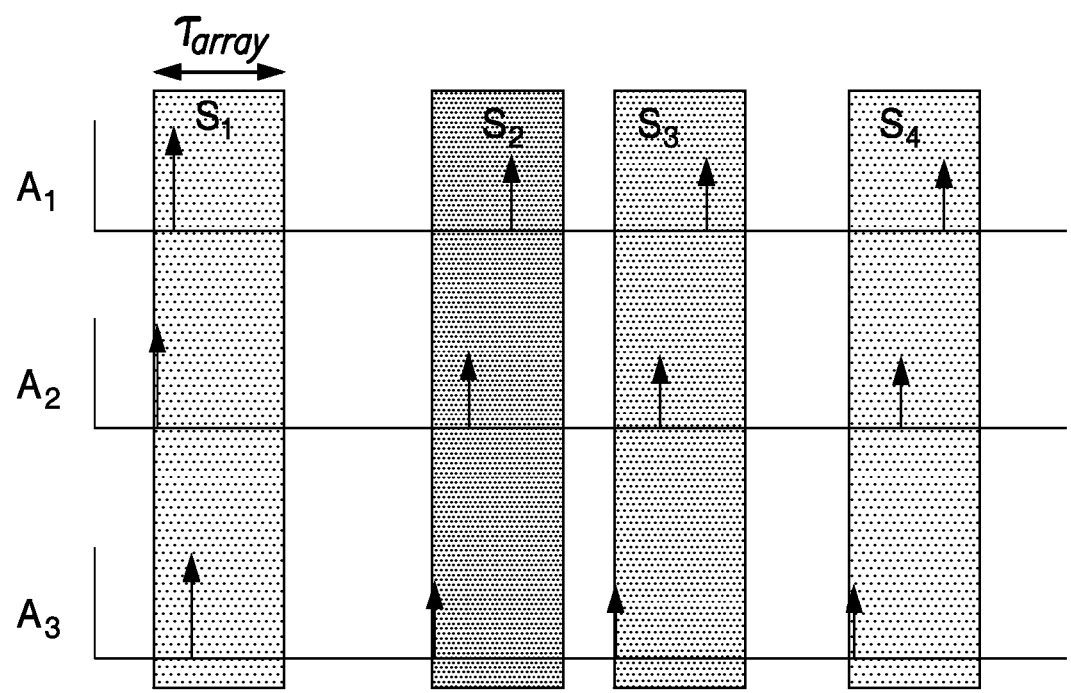

For illustration purposes, FIGS. 2 and 3 show a scenario in which a source illuminates four scatterers S1-S4 that reflect the energy to a three-element antenna array A1-A3. In this example, there is no direct link/path from the source to the antenna array (NLoS). The first rule of the Spatial Consistency Algorithm places a band with a width equal to the maximum delay between antennas A1-A3 in the array over the multipath signatures. Signatures from a single scatterer do not spread more than the width of this band. The first band is aligned with the earliest arriving multipath echo.

In the illustrated case, the echoes are well separated, so the echoes associated with scatterer S1 are uniquely identified. Continuing with the process, the band is aligned with the earliest arriving second echo. Subsequent applications of this rule identify which scatterers are associated with each multipath echo.

Figure 4:
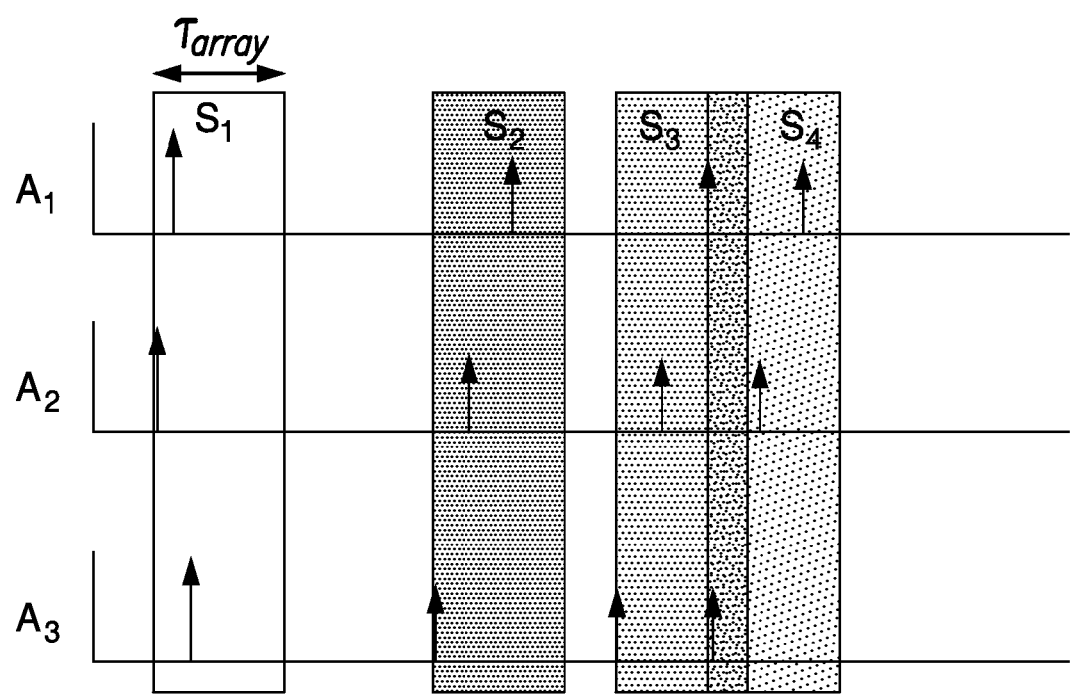
FIGS. 4 and 5 illustrate an example with an overlap of multipath echoes.
Figure 5:
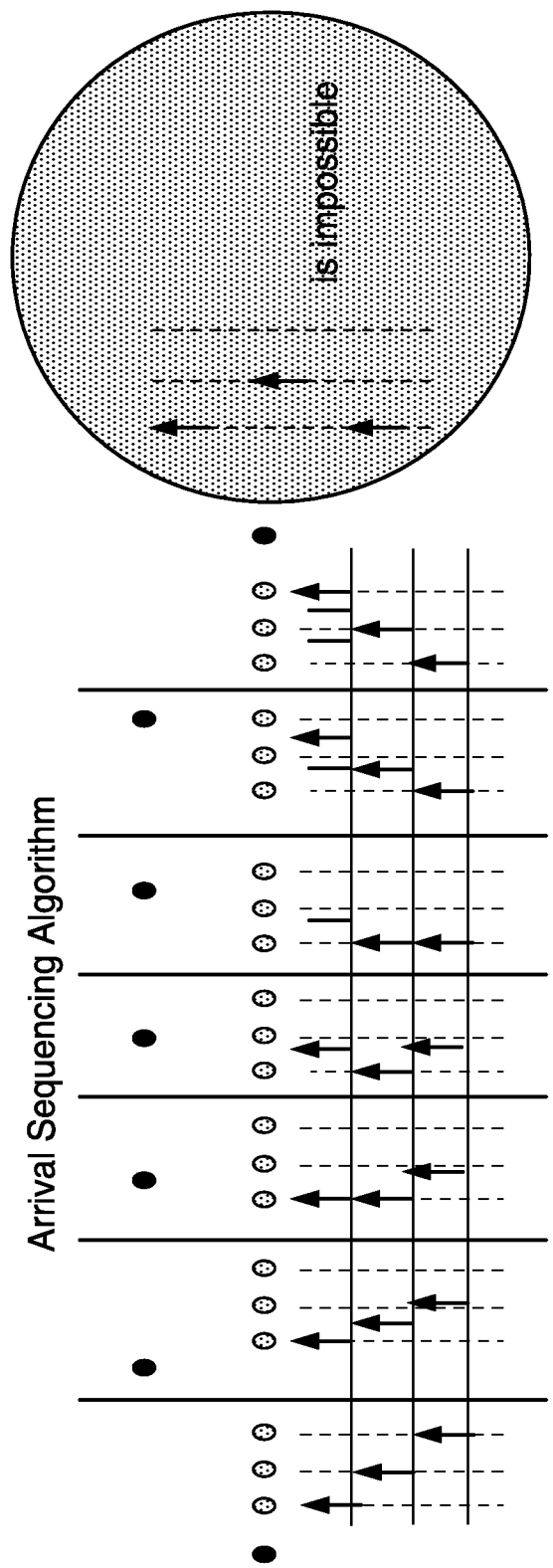

A second example, illustrated in FIGS. 4 and 5, shows a case where there is some overlap of the multipath echoes (the two right-most bands corresponding to S3 and S4). This triggers the second layer of the Spatial Consistency Algorithm. Here, the result is still easily achieved, but more complex cases are possible. In this case, the band is placed with its left-most or earliest edge on the earliest arriving scatterer in the region marked S3. It can be seen that there may be some confusion as to which multipath peak on A2 belongs to the scatterer S3. However, selecting the wrong peak will create a violation of the second layer of the consistency algorithm which identifies the multipath arrival sequencing options and by examination of FIG. 5 we can see that there is no configuration of scatterers that will allow the signal arriving on A2 to arrive later than both A1 and A3.

Consequently, the only valid option is that the first (left-most) of the multipath spikes that lies in the band labeled S3 on array element labeled A2 is the correct option for the reflection from the third scatterer. This is a simple application of the Spatial Consistency Algorithm, which excludes potential scatterer configurations that correspond to impossible relative locations of the scatterers and the antennas. The process can be applied in much more complex situations, and it will identify the correct configuration of scattering returns allowing the multilateration algorithm to be correctly applied.

A more complex application of the process was used to assign the signals to a variety of scatterers that will be used in the cityscape simulation example described later in this document.

Next, linearization of the multilateration algorithm ("linearized multilateration") mentioned above is described. Multilateration essentially means that a distance travelled from a source to a receive antenna by electromagnetic energy (we will refer to this generically as "light" for simplicity, although it is not assumed that we are referring to visible light) can be correlated with the time taken to travel that distance, by multiplying the time by the speed of wave propagation. (Again, although references are made to the speed of "light" in the medium of interest (e.g., air, vacuum) denoted by the letter c for simplicity in RF applications, another speed may be applicable, particularly in ultrasound and other non-RF applications.) This can be described by the following family of equations:

$$(X-x_i)^2+(Y-y_i)^2+(Z-z_i)^2=c^2(T+t_i)^2, \quad (1.1)$$

where X, Y, Z denote the coordinates of the source we are trying to geolocate; $(x_i, y_i, z_i)$ denote the coordinates of the ith observer array element, or the ith element in the virtual scattering array that we are using; T denotes the emission time of the transmission source being geolocated with respect to t=0; and $t_i$ denotes the time of arrival with respect to the agreed t=0 reference used. Hence T will normally be a negative number, because it denotes that the signal was emitted before it was received on the array.

In this equation, (X, Y, Z, T) are the unknowns. This is a highly non-linear equation which may require sophisticated digital signal processing (DSP) techniques to solve. In addition, it may not be possible to find a unique solution to the equations, because every term ($(X-x_i)$ and similar terms) can in principle have both a positive and negative value for the solution, the sign being removed by the squaring operation.

The non-linearity of the problem can be removed or reduced, however, if it is noted that by taking the differences of these equations between pairs of antennas, the equations for the ith antenna can be rewritten as $$(X^2+Y^2+Z^2-c^2T^2)-2x_iX-2y_iY-2z_iZ-2c^2t_iT=c^2t_i^2-x_i^2-y_i^2-z_i^2, \quad (1.2)$$

and for the jth antenna as $$(X^2+Y^2+Z^2+c^2T^2)-2x_jX-2y_jY-2z_jZ-2c^2t_jT=c^2t_j^2-x_j^2-y_j^2-z_j^2. \quad (1.3)$$

By subtracting these two equations, the squared terms in X, Y, Z, and T drop out leaving $$(x_i-x_j)X+(y_i-y_j)Y+(z_i-z_j)Z+c^2(t_i-t_j)_iT=0.5[(x_i^2-x_j^2)+(y_i^2-y_j^2)+(z_i^2-z_j^2)-c^2(t_i^2-t_j^2)] \quad (1.4)$$

which can be rewritten as $$(\overline{X}_{ij})X+(\overline{Y}_{ij})Y+(\overline{Z}_{ij})Z+c^2(\overline{T}_{ij})T=K_{ij}^2, \quad (1.5)$$

where $\overline{X}_{ij}=x_i-x_j$ and $K_{ij}^2=0.5[(x_i^2-x_j^2)+(y_i^2-y_j^2)+(z_i^2-z_j^2)-c^2(t_i^2-t_j^2)]$.

This is a linear equation with four unknowns (X, Y, Z, T). Hence, it requires four sets of equations for a unique solution. To obtain solutions to these equations, four antennas may be used. We obtain the ij difference terms by selecting four of the available $$N = \binom{4}{2} = 6$$

differences between the signals and coordinates of antennas (i.e., (2-1), (3-1), (3-2), (4-1), (4-2), or (4-3)). The solution to this equation can then be expressed in matrix form, thus:

$$\begin{bmatrix} X \\ Y \\ Z \\ cT \end{bmatrix} = \begin{bmatrix} \overline{X}_{12} & \overline{Y}_{12} & \overline{Z}_{12} & c\overline{T}_{12} \\ \overline{X}_{13} & \overline{Y}_{13} & \overline{Z}_{13} & c\overline{T}_{13} \\ \overline{X}_{14} & \overline{Y}_{14} & \overline{Z}_{14} & c\overline{T}_{14} \\ \overline{X}_{23} & \overline{Y}_{23} & \overline{Z}_{23} & c\overline{T}_{23} \end{bmatrix}^{-1} \begin{bmatrix} K_{12}^2 \\ K_{13}^2 \\ K_{14}^2 \\ K_{23}^2 \end{bmatrix}. \quad (1.6)$$

The above equation can be solved by a simple inversion of the matrix:

$$A = \begin{bmatrix} \overline{X}_{12} & \overline{Y}_{12} & \overline{Z}_{12} & c\overline{T}_{12} \\ \overline{X}_{13} & \overline{Y}_{13} & \overline{Z}_{13} & c\overline{T}_{13} \\ \overline{X}_{14} & \overline{Y}_{14} & \overline{Z}_{14} & c\overline{T}_{14} \\ \overline{X}_{23} & \overline{Y}_{23} & \overline{Z}_{23} & c\overline{T}_{23} \end{bmatrix}. \quad (1.7)$$

We are attempting to solve for (X, Y, Z, T) rather than the more basic (X, Y, Z). The inclusion of T as an unknown in this equation allows to geolocate in steps where the calculated T values for one set of scatterers become the Tij values for the subsequent steps.

The linearization process allows solution of the equations by a matrix inversion. The inverse of a 4×4 matrix can be written as follows:

$$A^{-1} = \frac{1}{\det(A)} \begin{bmatrix} C_{11} & C_{12} & C_{13} & C_{14} \\ C_{21} & C_{22} & C_{23} & C_{24} \\ C_{31} & C_{32} & C_{33} & C_{34} \\ C_{41} & C_{42} & C_{43} & C_{44} \end{bmatrix}. \quad (1.8)$$

The term det(A) in the equation above represents the determinant of the matrix and the terms Cij are the cofactors of the matrix. This technique fails when det(A)=0. However, from linear algebra it is known that det(A) can equal zero only under certain conditions. The determinant of matrix is zero if:

1. any one or more rows or columns are zero;
2. any two rows or columns are identical or are multiples of each other; or
3. any row or column can be expressed as a linear sum of any other rows or columns.

Figure 6:
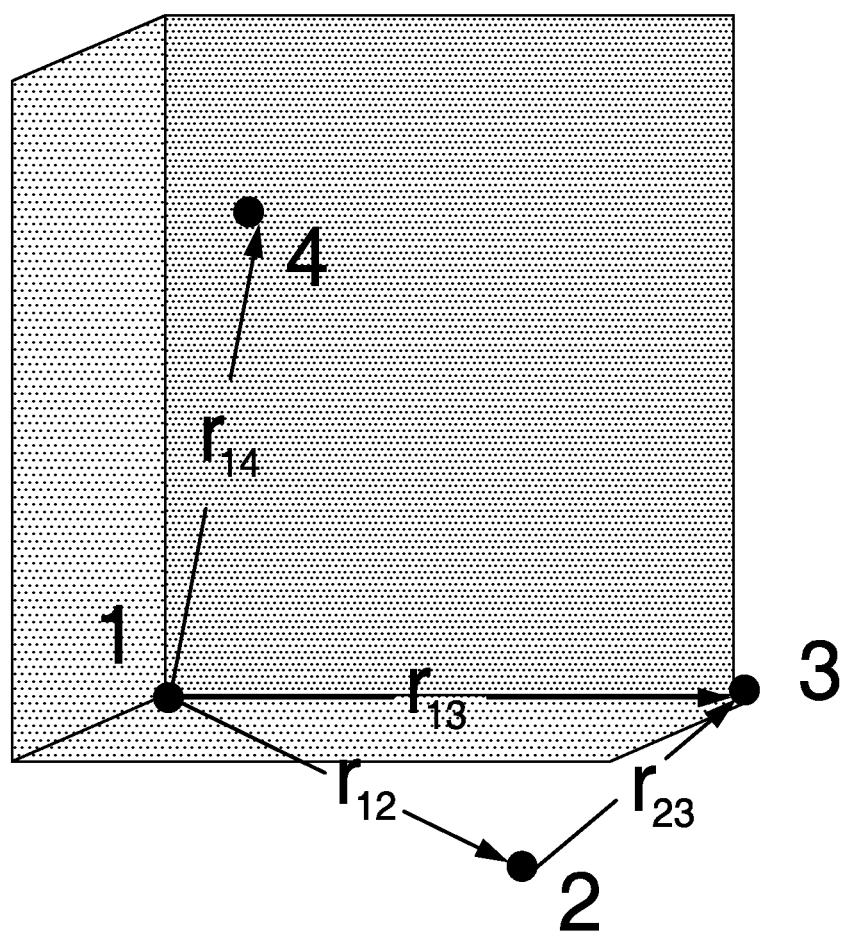
FIG. 6 illustrates a spatial diversity requirement.

It can be seen that certain geometrical arrangements of the antennas create precisely this condition. For example, a perfectly linear (inline) array of antennas will violate one or more of the three conditions noted above. If all the antennas lie in a single plane, a similar violation occurs. In fact, the determinant non-singularity condition requires that the following geometrical condition is met:

$$r_{12} \cdot (r_{13} \times r_{14}) \neq 0 \quad (1.9)$$

for any combination l, m, n of the vectors in the geometrical array diagram (an example of which is shown in FIG. 6), where l, m, n can be any combination of the pairs (12), (13), (14), assuming node 1 is the element from which the three vectors radiate.

In embodiments, the position vectors of the antenna elements satisfy the array spatial diversity condition (1.9). In embodiments, the scatterers are chosen so that this condition is satisfied at each stage of the multi-hop (multi-stage) calculation.

The above condition is the most general condition for 3-D geolocation.

For 2-D geolocation, three antennas may be used, and the non-singularity condition requires only that they are coplanar, but not collinear. The geometrical condition satisfying this condition is this:

$$(r_{12} \times r_{13}) \neq 0. \quad (1.10)$$

The conditions for 3-D and 2-D intrinsically determine in advance whether a particular antenna array configuration will enable successful geolocation.

Figure 7:
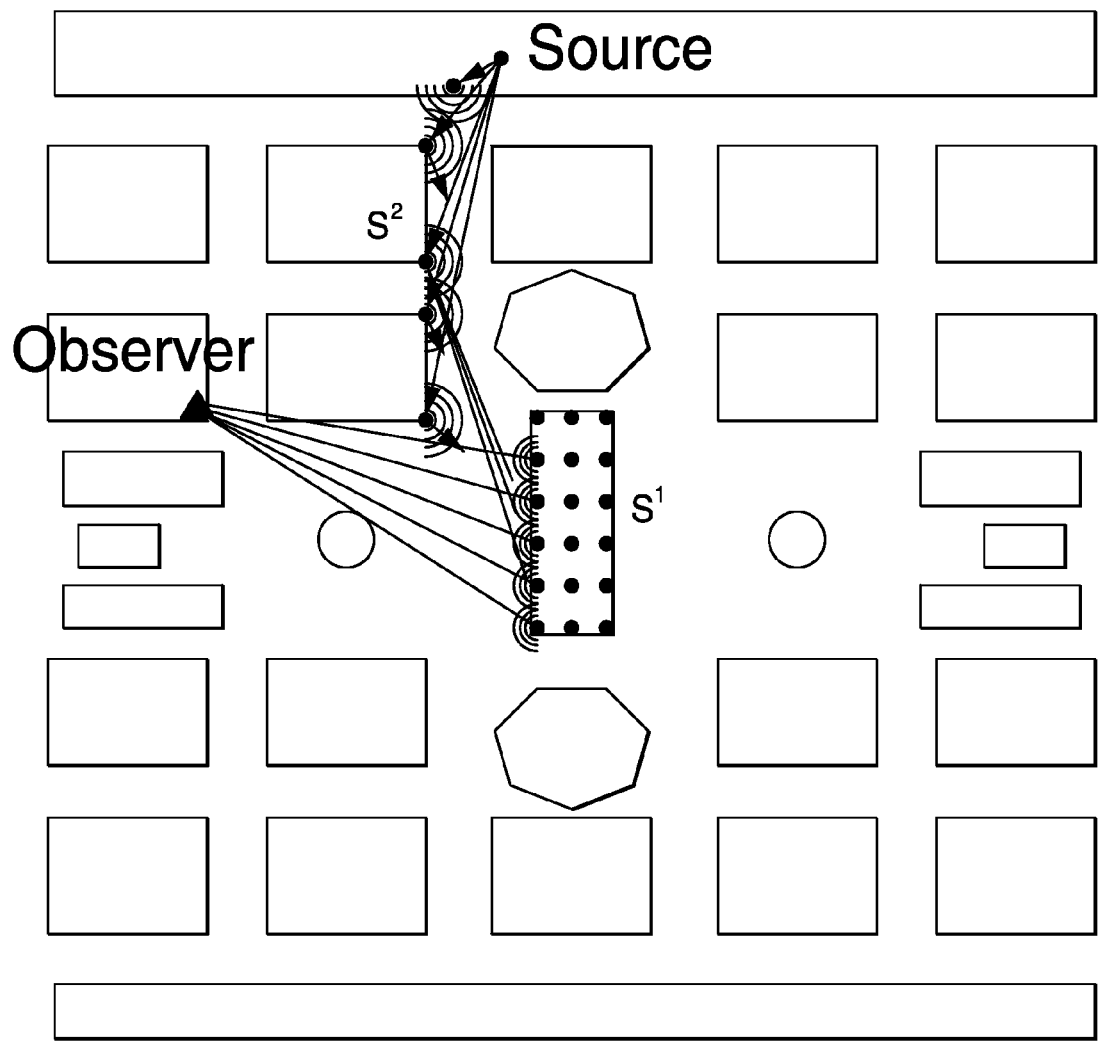
FIG. 7 illustrates an example of a geolocation technique in a cityscape environment.

An example of this geolocation technique is described with reference to FIG. 7. A source and an observer are placed in a strict NLoS 2-D cityscape environment shown. Any signals emitted by the source only reach the observer by reflecting off sets of scatterers. For this simulation, two sets of scatterers are used. One set has direct LoS to the observer and a second set has direct LoS to the source. Each scatterer set has direct LoS to the other scatterer set. In the simulation, a large number of scatterers were available, but, in order to maintain simplicity, only the minimum number of scatterers required to perform geolocation were actually used for the calculations.

Figure 8:
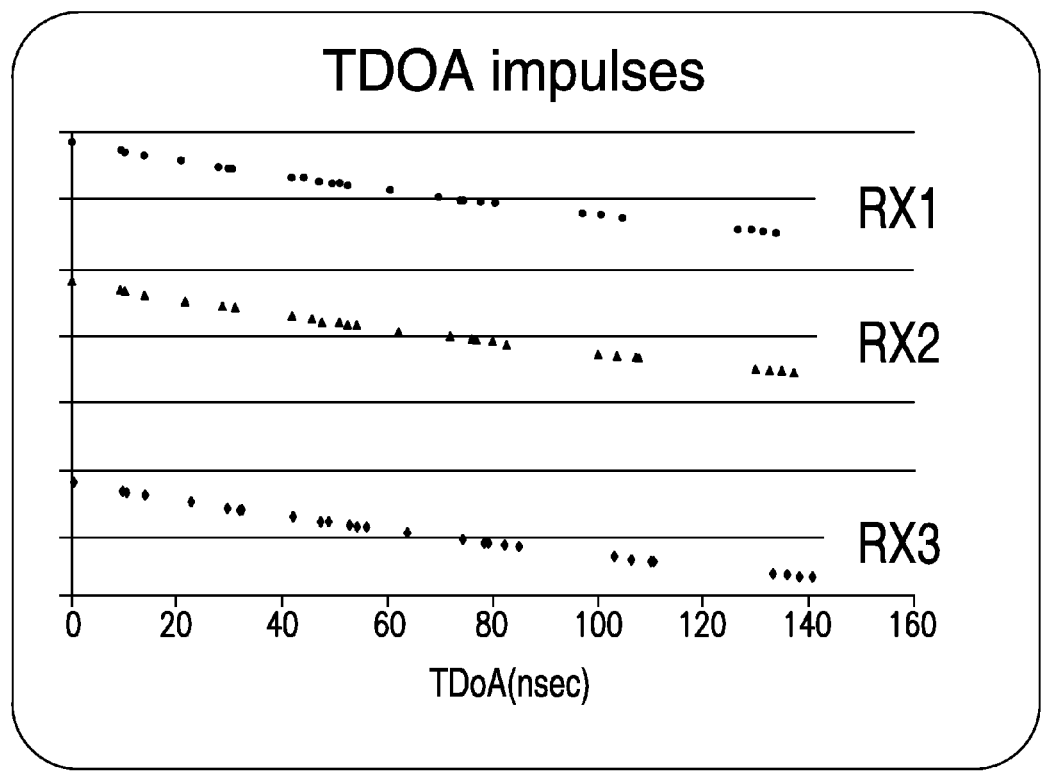
FIG. 8 illustrates times of arrival of various multipath impulse responses for the example of FIG. 7.

The ToAs of the various multipath impulse responses are plotted versus time for each of three antennas in the diagram of FIG. 8. In the diagram, each dot represents a detected multipath impulse on each of the array elements. The arrival time can be determined by projecting the point down to the x-axis and reading the TDoA value with respect to the earliest arriving pulse.

Figure 9:
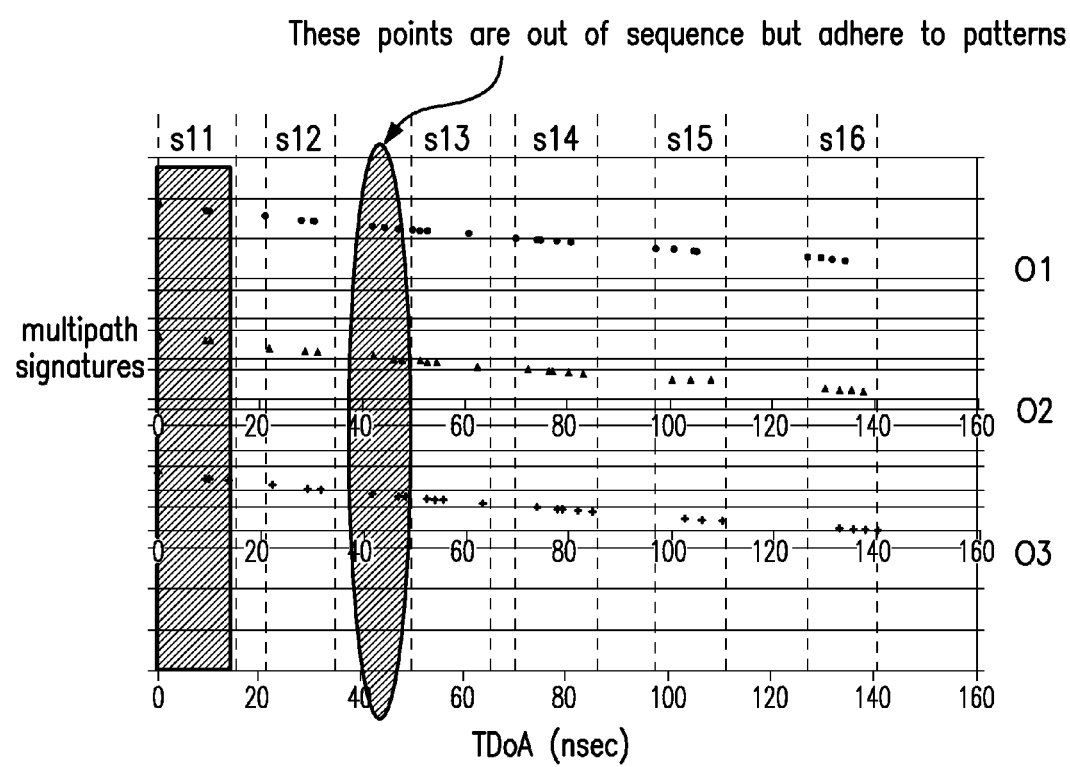
FIGS. 9 and 10 illustrate application of a Spatial Consistency Algorithm.

When the Spatial Consistency Algorithm is applied for a known set of observer array coordinates (see FIG. 9), it can be seen that the signatures are grouped according to various scatterer designations where sij denote the scatterers that have LoS to the observer. So, for example, all the points lying within the boundaries that enclose s16 represent signals reaching the observer array antennas O1 to O3 at various arrival times after reflecting from scatterer s16. Although difficult to see in this diagram, there are five points on each array element between the s16 boundaries. In this case the first point arrives from the scatterer s21 via the scatterer s16. The second point (lying almost on top of a third point) represents signal that travelled via the scatterer s22 and s16, etc. If the Geolocation algorithm is then applied to each set of points in turn, a single set of spatial coordinates for s16 repeated five times but with five different arrival times for each occurrence is obtained. This means that s16 was illuminated by five different additional scatterers.

Figure 10:
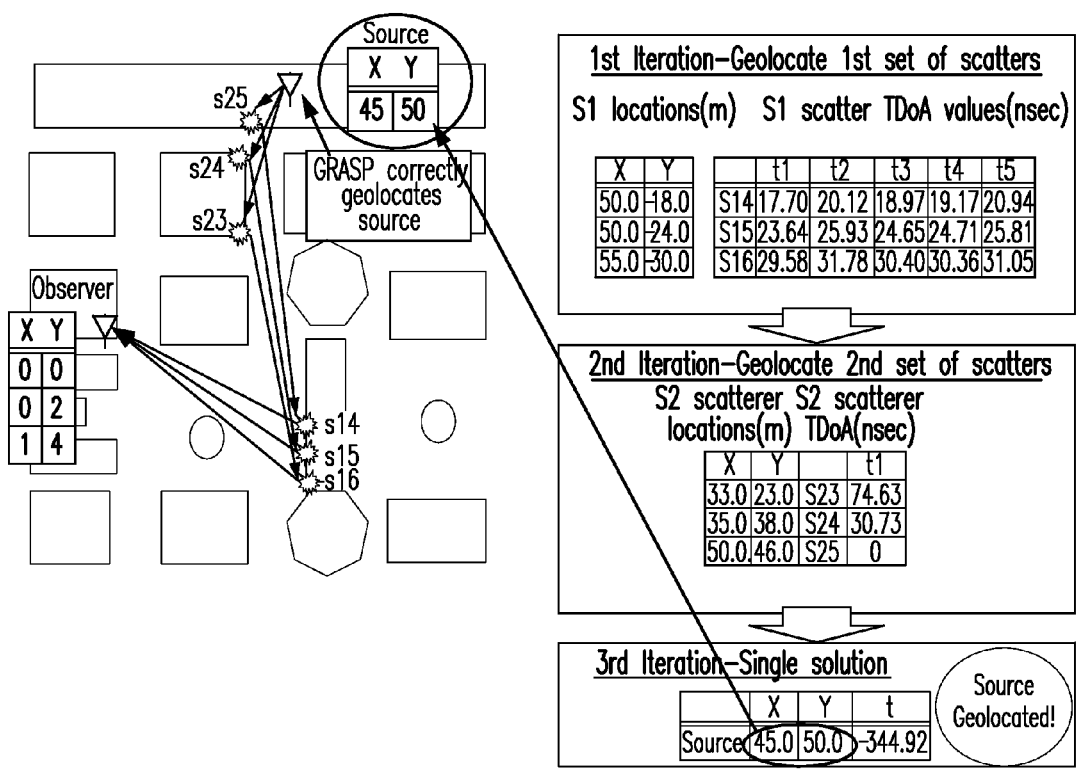

A concise and simplified summary of the results for this example is shown in FIG. 10. To keep the diagram simple, the results of only three scatterers at each location are used, although more results were actually calculated.

The results on the right hand side of the diagram show the geolocation of the first set of scatterers. The (X, Y) coordinates of scatterers s14, s15 and s16 are shown, each of them indicating five different arrival times. Three of the arrival times are selected, and in stage 2 of the process three additional scatterers, s23, s24, and s25 are identified, along with a single arrival time for each scatterer. The single arrival time indicates that there is one common source illuminating each of these scatterers, and the third geolocation iteration is applied to identify the source location and emission (reflection) time. While performing the simulation, originally three scatterers (s11, s12, and s13) were used with identical x coordinates and the first pass failed the spatial non-singularity condition; a different set of scatterers then needed to be selected. As can be seen from the chart, the x coordinates were x=50, 50, and 55 m, whereas the first time they were x=50, 50, and 50 m. This means the scatterers were collinear and unable to uniquely geolocate the source. Thus, in embodiments, the selection of scatterers is performed so that at each step the selected scatterers satisfy the non-singularity condition.

In more general cases, four or more antennas may be used to calculate the differential times of arrival, and then the difference between antenna pairs (e.g., antenna pairs 1,2, and 1,3, and 1,4) are calculated. In the example shown above, differences calculated between antenna pairs 1,2 and 1,3 and 2,3 were used. This example was set up to work with this configuration to keep illustrative diagrams simple, but more generally, the condition where antenna pairs utilize pairs that have already been utilized may be avoided. For example, if the pairs 1,2 and 1,3 are used, then 2,3 may create problems since both 2 and 3 have been utilized previously. However, if 1,4 is used, then it can be guaranteed that this pair will provide unique information.

At each stage of this iteration we calculate not only the coordinates of the scatterers, but also the time of arrival (which is also the time of emission/reflection) of the signals from each scatter. It is the combination of both the spatial coordinates and time results that allow the use of each set of scatterers as a virtual antenna array to locate the next set of scatterers. In order to act as a geolocation array, the coordinates and the ToA of the signals of each element of the array should be determined.

There are many variants of this technique that can be used. For example, it may be possible to use the observer array as an active source to illuminate an otherwise NLoS passive target. In this case the active source is now one or more of the array elements, but the algorithm can still be applied, because even though we are now interested in a full round trip cycle of the signal, the situation is still substantively the same and we will effectively geolocate the intended target as a scatterer. However, the situation is more complex in that both forward scattering and backscattering may be encountered, and it may not be a trivial task to identify which of the scatterers that have been geolocated is the intended target.

Another problem that may arise occurs when the signal-to-noise ratio (SNR) of the signal emitted from an active scatterer is very weak due to multiple scattering before it reaches the observer. One possibility in this process is to use the array in an active manner to geolocate the first set of scatterers that are LoS to the array. Once scatterers in the first set of scatterers are accurately identified, it is easier to geolocate any subsequent scatterers. However, a problem with this is that the active emission by the array may illuminate many scatterers which are not visible to the signal emitted by the transmission source sought to be located. Although there should in theory be some scatterers common to both processes, it may be difficult to identify them in rich scattering environments. Time-reversal precoding can be used to solve this problem. If the observer array captures the incoming signals from the source, time-reverses the captured multipath signatures, and re-emits them back to the source, the time reversal process causes the observer array to automatically focus the signals only on the scatterers which were involved in the downward path, and to provide both array gain and multipath gain. This greatly de-emphasizes any scatterers that may generate signals in the reverse direction but were not visible in the forward direction, and increases the signals emitted by the intended scatterers. (Forward direction here means the direction from the source sought to be located to the observer antenna array; backward direction is the opposite direction.)

Time reversal techniques are described in International Patent Application Number PCT/US 12/36180, entitled DISTRIBUTED CO-OPERATING NODES USING TIME REVERSAL, which is commonly owned with the present application, and in which the inventor of the present application is one of the named inventors, and which is hereby incorporated by reference in its entirety as if fully set forth herein, including text, figures, claims, tables, computer program listing appendices, matter incorporated by reference in the patent document, and all other matter in the document.

Figure 11:
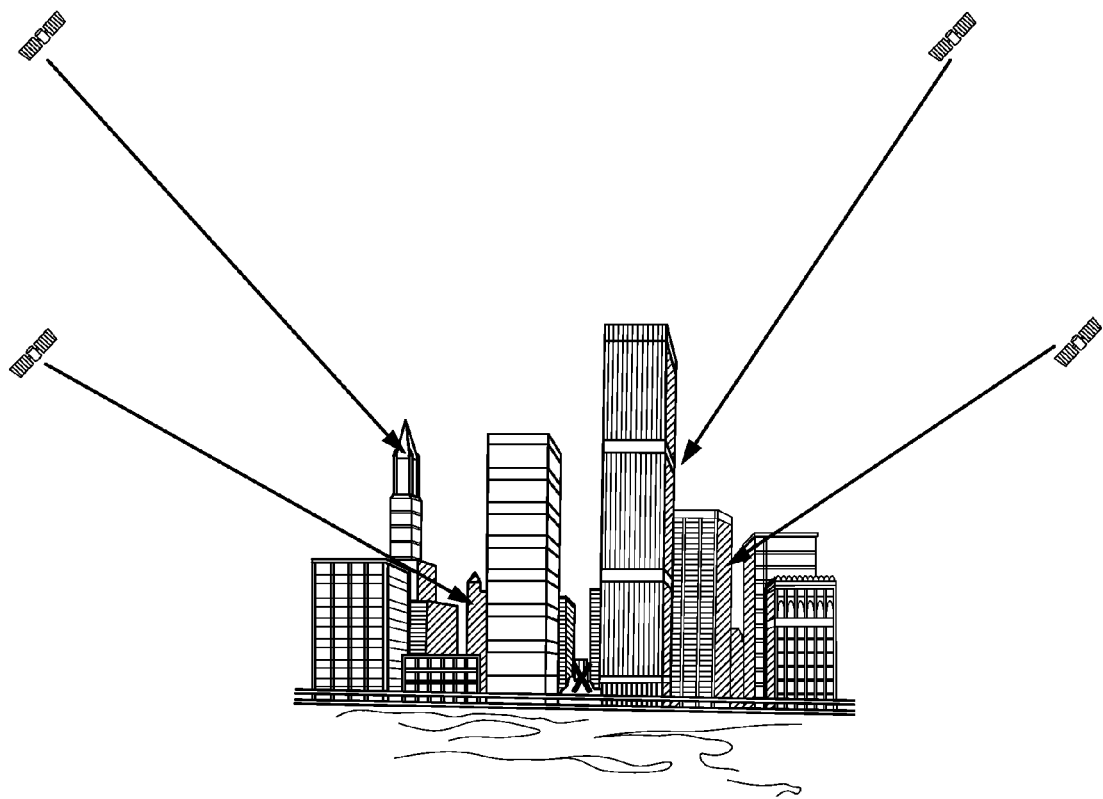
FIGS. 11 and 12 illustrate an example of GPS enhancement through use of a relay station.

Next, the use of the above techniques is described as they are applied to GPS enhancement. Global Positioning Satellite systems may not work well (or work at all) in environments without direct line-of-sight between the GPS receiver and the GPS satellites. Examples of typical environments that experience these problems are indoor environments, large cities with tall buildings, woods and other areas under continuous tree canopies, caves, hangers, and other areas with limited visibility of the sky. An example of a city environment with difficult GPS reception is illustrated in FIG. 11.

This deficiency of GPS systems is not commonly understood, because most people experience GPS systems only in their vehicles, and the vehicles do not require continuous GPS coverage. Many vehicle-based GPS systems can determine their positions relative to an initial GPS location by monitoring the movement of the vehicle and confining the position to the most likely location on a map. In other words, satellite position determination may be supplemented by one or more other techniques, such as dead reckoning, inertial navigation, and/or map matching. Infrequent updating is all that may be needed to maintain reasonable accuracy in this type of application. But if the vehicle system is unable to initialize its position or update it within some period of time or within some distance of travel, the vehicle GPS system may fail in determining its correct location.

Failure of a GPS system may be merely annoying in a civilian setting. It is more serious for the military and law enforcement personnel operating in cluttered cities and similar environments. Rapid deployment is often a necessity in such settings, and it may not be possible to obtain an initial location. It may also be useful for people in the mining industry and entities responsible for underground rescue to be able to perform accurate geolocation.

Figure 12:
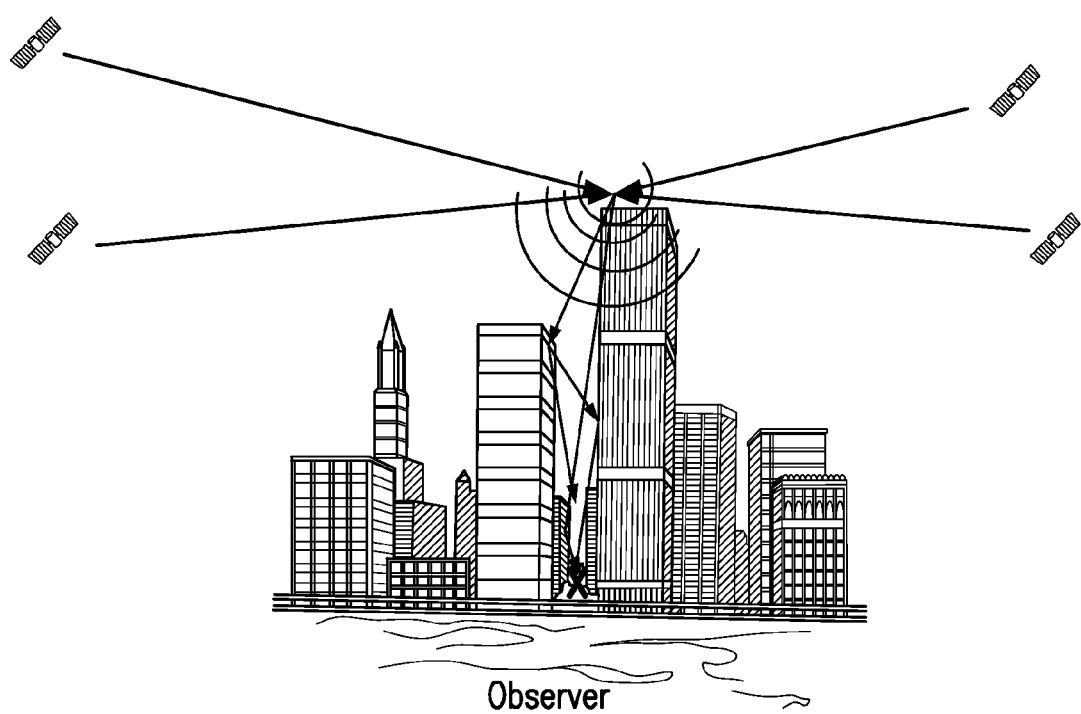

The techniques for geolocating a transmission source described in this document can be advantageously employed to improve geolocation, particularly where direct line-of-sight between the receiver (which attempts to self-geolocate) and one or more GPS satellites is impaired or unavailable. This approach is described below and illustrated in FIG. 12.

In embodiments, a beacon or a relay station obtains its own coordinates. The relay station may store the coordinates and/or obtain them dynamically, for example, using at least in part GPS satellites, other techniques, or combinations of techniques. In particular, the relay station may be mobile and continuously, continually, periodically, or otherwise measure and update its own coordinates using GPS, possibly in combination with dead reckoning, inertial navigation, map matching, and/or other techniques. It may also receive its own coordinates from a local or remote human operator or a machine source. In a particular exemplary embodiment, the relay station has full LoS visibility of the sky and is capable of measuring its own position accurately from the signals of GPS satellites.

The relay station then transmits its signal (or signals) carrying information from which the current coordinates of the relay station can be determined. In other words, the signal(s) transmitted by the relay station include embedded information from which the current coordinates of the relay station can be determined; for example, this information is modulated onto the signal(s). The relay station may send the signal(s) to the observer in a hostile environment. The signal(s) may be in the RF/microwave part of the electromagnetic spectrum, and the observer may have a radio receiver compatible with the relay station's signal(s). The signals of the relay station may be specifically designed for detection by the observer's receiver, for example, be transmitted at a power level that is higher than the GPS signals, and/or in a different frequency band.

This arrangement, however, may not solve all problems, because the observer/receiver (which is trying to self-geolocate and may be deprived of LoS to one or more needed satellites) may also not have LoS to the relay station. If the channel between the observer/receiver and the relay station is non-line-of-sight, then conventional techniques may not be helpful in accurately determining the relative positioning of the relay and the observer/receiver. The observer/receiver needs this information (relative position) to accurately calculate its coordinates by applying a correction and offset to the GPS data sent in the signal(s) of the relay station.

The techniques for geolocating a non-line-of-sight transmitter may be employed by the observer/receiver. The techniques allow the observer/receiver to geolocate the relay station, often with high accuracy. The relay station may be receiving the GPS signals (or otherwise know its coordinates) even when the observer/receiver is buried in a severe NLoS and high multipath environment. Indeed, the use of multipath may be the only way to detect a signal emitted from a source (e.g., from the relay station) which is NLoS to the observer/receiver. Hence an algorithm that is capable of decoding the spatial correlation embedded in the multipath signal is quite useful.

In operation, the observer/receiver attempts to read the content of the signal (or signals, as the case may be) transmitted from the relay station. The signal contains the coordinates (e.g., GPS coordinates) of the relay station. This step of the process may be performed as in the case of a conventional communication channel. Additionally, time-reversal precoding or other matched filter detection techniques may be used to enhance the accuracy of this step, particularly when the multipath would render a conventional system unavailing, for example, due to the multipath decay and the consequent intersymbol interference. This step may be performed by using the same antenna or antenna array that the observer/receiver uses to perform geolocation, or a different antenna or antenna array.

Note that the observer may already know the location of the relay station in advance, by some pre-agreed communication or initialization procedure, particularly if the relay station is static.

Another step of the geolocation process is the application of any of the techniques described above (i.e., geolocation in the presence of severe multipath or even in NLoS conditions) for determining the position of the relay station relative to the observer/receiver. The observer/receiver may first perform a deconvolution of the signal received from the relay station to remove the effect of pulse shaping and to recover the true time of arrival of the multipath echoes. When the observer/receiver has acquired this information through its antennas (e.g., three or more antennas or one antenna moved to multiple different locations), consistent with the requirements of the techniques, the observer/receiver applies the techniques described above to geolocate any scatterers in the path between the relay station and the observer/receiver, and then uses the scatterers as a virtual array to geolocate either a next set of scatterers or the relay station itself. Recall that the observer/receiver has direct LoS to the first set of scatterers. The observer/receiver can use the first set of scatterers as the virtual antenna array to geolocate a second set of scatterers, which have LoS visibility to the first set of scatterers, and the process can continue until the last set of scatterers has direct LoS visibility of the relay station. The relay station is then geolocated, resulting in the observer/receiver obtaining the knowledge of the relative offset (positional difference) between itself and the relay station.

The observer/receiver may then add this relative offset to the absolute position of the relay station information. Recall that the absolute position of the relay station was obtained in the course of the first of the steps described above.

As an additional benefit, this procedure also enables the observer/receiver to set its time reference system to an accurate time, because the geolocation algorithm also calculates the time offset at which the relay station received its GPS coordinates compared to the observer/receiver clock. Suppose the observer/receiver defines its time base as having zero offset. Suppose further that the observer/receiver calculates that the relay has a time offset of −10 microseconds relative to its own time base. Then, to calibrate its clock, the observer/receiver can simply add 10 microseconds to the accurate GPS ephemeris time that was sent by the relay station, because the observer/receiver "knows" the relay station emitted its signal 10 microseconds before the observer/receiver detected the signal.

The procedure described thus allows an observer/receiver to calibrate both its position and its time reference to a GPS signal in severe NLoS conditions dominated by multipath.

Figure 13:
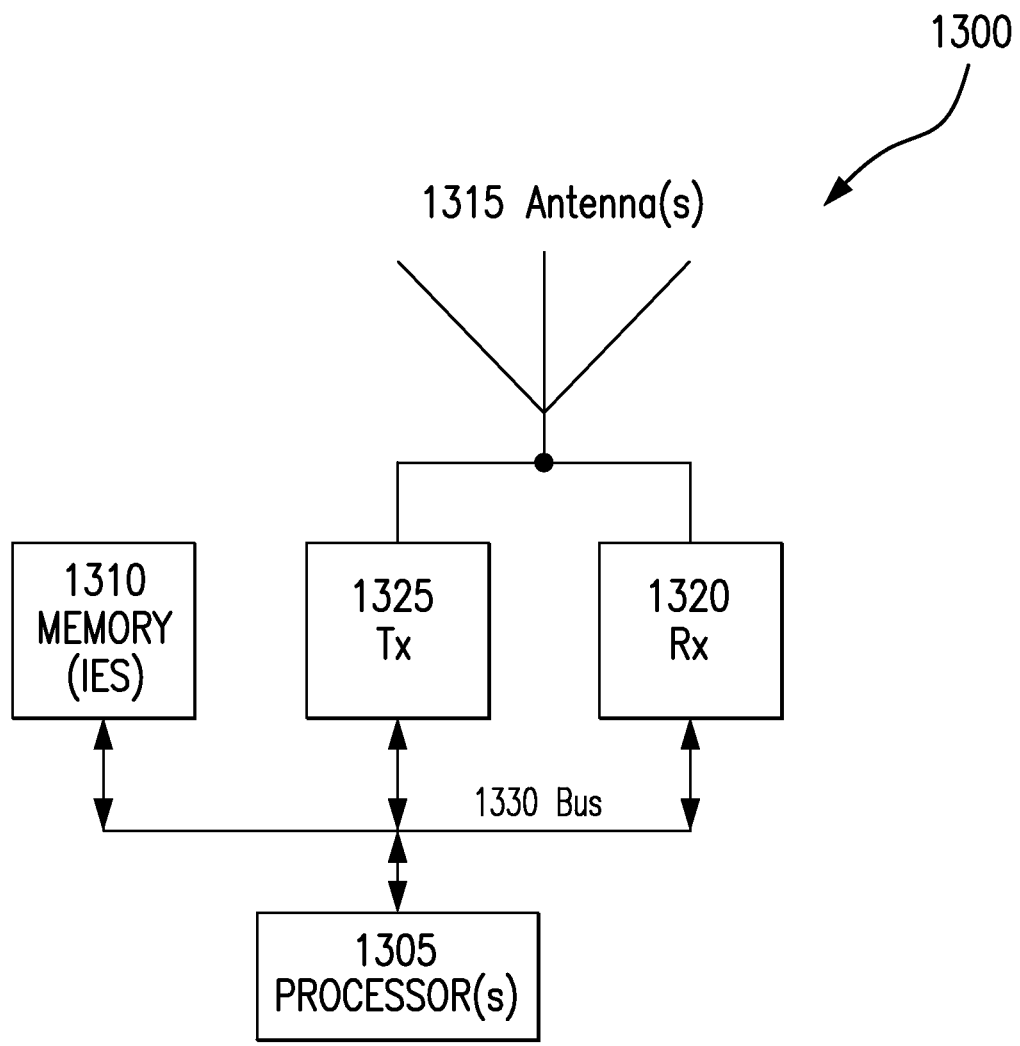
FIG. 13 illustrates selected components of a system that can be used for geolocation and/or GPS enhancement.

FIG. 13 shows selected components of a system 1300 that can be used for geolocation and/or GPS enhancement described above. The system includes one or more processors 1305 and one or more memories 1310 storing code executable by the one or more processors 1305 to perform some or all of the steps of the methods/procedures. The system further includes one or more antennas 1315, and one or more receivers 1320 configured to receive signals (e.g., RF/microwave signals). The one or more receivers 1320 are also coupled to the one or more processors 1305, which can, under control of the code, configure the one or more receivers 1320 and read information from the receivers 1320. The system 1300 may also include one or more transmitters 1325. The one or more processors 1305 may, under control of the code, configure the transmitters 1325, to illuminate the object sought to be located, and to transmit signals and/or information to other stations (including, e.g., the relay station).

One or more buses 1330 may connect the various electronic components (e.g., the processors, memories, receivers, transmitters).

Figure 14:
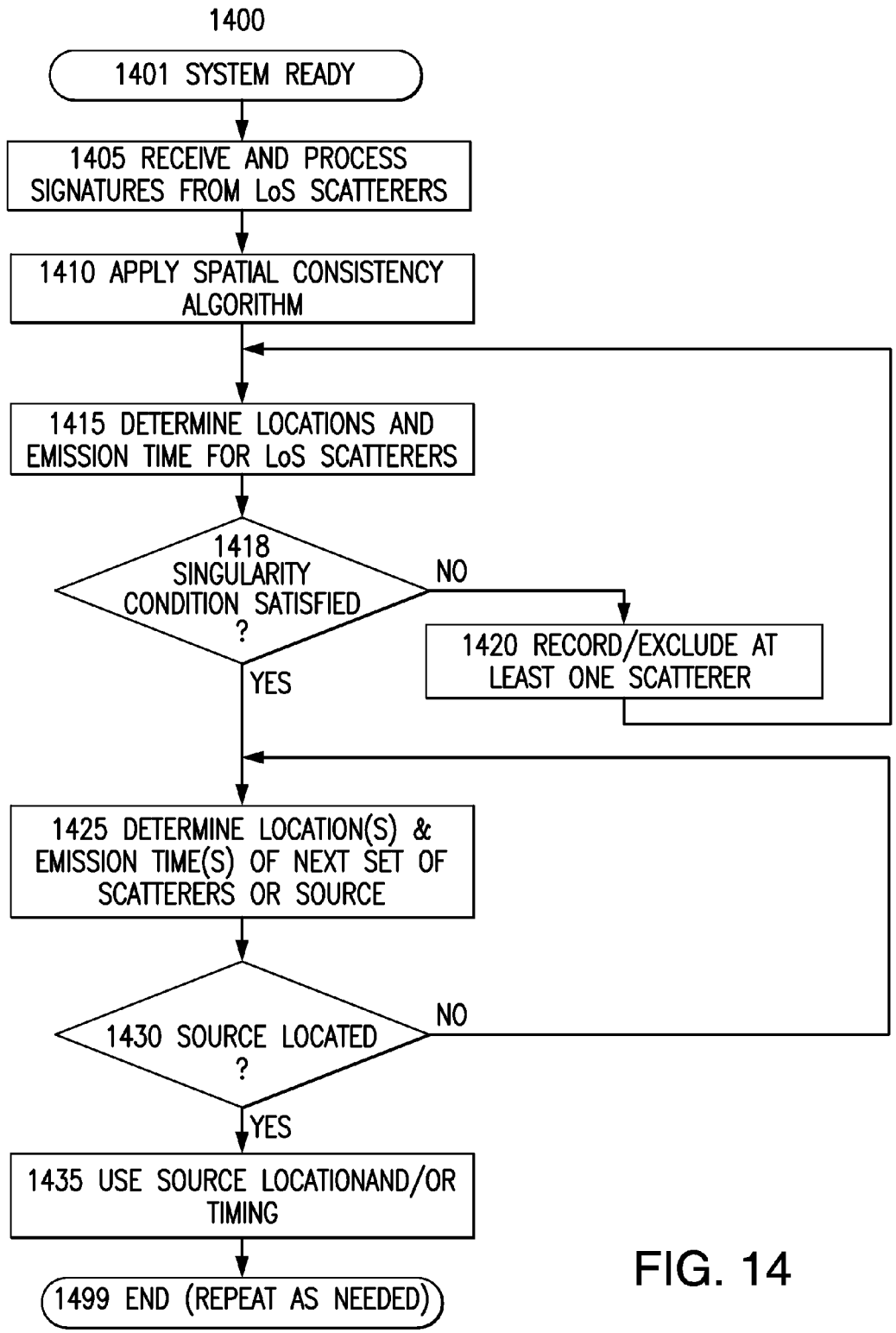
FIG. 14 illustrates selective steps/blocks of methods for geolocating.

FIG. 14 shows selected steps/bocks of a method 1400 for geolocating an NLoS transmission source from a system of one or more receivers coupled to an antenna array of a plurality of antenna elements.

At flow point 1401, the system is powered up, initialized, and ready to perform the steps of the process.

In step 1405, the system receives and processes signatures of reflections of a transmission from the source.

In step 1410, the system applies the Spatial Consistency Algorithm to determine and select a plurality of scatterers that are LoS to the system.

In step 1415, the system determines the locations of the scatterers from the step 1410, and their respective times of emission/reflection. Multilateration using TDOA analysis may be used for this purpose, as is described above.

In decision block 1418, the system determines whether the scatterers selected and located in the steps 1410 and 1415 satisfy the non-singularity condition. If the condition is not satisfied, process flow proceeds to step 1420, in which the system records the location of the scatterers to exclude at least one of them from selection, and then returns to the step 1415 to select a different plurality of scatterers that are LoS to the system. Note that the new set may include some of the scatterers from the previous set(s).

Otherwise, the process flow continues to step 1425, in which the system uses the last set of scatterers as a virtual antenna array to determine (1) the location(s) and times of emission of the next set of scatterers, or the location of the transmission source; this may be done in the manner identical or analogous to that used in the steps 1410-1420.

In decision block 1430, the system determines whether the transmission source has been located. Note that if the locations of the next set of scatterers are essentially identical, as are the times of emission from those scatterers, then this indicates that the next set of scatterers is likely to be the transmission source. If the transmission source has not been located, the process flow may go back to the step 1425, and iterate through this loop until the transmission source is located.

Otherwise, the process may continue to step 1435, to use the location of the source and the time of transmission from the source in one or several ways, for example, recording it displaying it, targeting a weapon or a transmission towards it, and/or in another way.

The process may then terminate in flow point 1499, and be repeated as needed.

As noted above, the system may make this decision based on the locations that are or the to determine whether the transmission source has been geolocated; this can be the direct result of the location of As those skilled in the art would understand from this document, the demarcation lines between various blocks and components shown in the Figures are arbitrary to some or even great extent. For example, some components of the receivers may be placed in the processors, and vice versa. Similarly, the memories may be separate from the processors and the receivers, or included in the receivers and/or processors, and the receivers and transmitters may be combined into transceivers.

Each of the processors 1305 may be a general purpose processor, a digital signal processor (DSP), an application specific integrated circuit (ASIC), a field programmable gate array (FPGA) or other programmable logic device, or even discrete logic; it can also be implemented as a combination of such processors and/or logic devices. A general purpose processor may be a microprocessor or a microcontroller.

The geolocating techniques described above can be used advantageously in non-RF applications. For example, blood clots may be located using distributed acoustic sensors placed on a person's body, enabling a physician to perform surgery immediately at a known location. Blood clots in the body can cause serious strokes or even death. Physicians usually rely on surgery or drugs to destroy blood clots in the brain, which blood clots might otherwise cause a stroke. Researchers have used Doppler ultrasound to detect irregularities in blood flow in major arteries and veins (either blocked or narrowed). Instead, one can perform multilateration of signals using distributed acoustic sensors to detect and geolocate irregularities inside the body. This is particularly important for high risk patients or during surgery, when blood clots can be lethal.

Distributed acoustic sensors can also detect and geolocate blood clots in the brain with distributed sensors placed around a person's skull. The techniques described above can enable pinpoint geolocation of the blood clot in the brain and enable pinpoint targeting by focused ultrasound, to break up the clots. Geolocation of blood clots combined with Time Reversal can focus energy onto detected blood clots to break them up, with acoustic energy focused at the target irregularity and sparing the surrounding tissue. Body network can be used with an active non-invasive acoustic source, or using the beating heart as the internal sound source, with passive listening.

Although steps and/or decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them and the accompanying Figures show them, except where explicitly so indicated, otherwise made clear from the context, or inherently required. It should be noted, however, that in selected examples the steps and decisions are performed in the particular progressions described in this document and/or shown in the accompanying Figures. Furthermore, not every illustrated step and decision may be required in every embodiment, while some steps and decisions that have not been specifically illustrated may be desirable or necessary in some embodiments.

As is known to those skilled in the art, data, instructions, signals, and symbols may be carried by voltages, currents, electromagnetic waves, acoustic waves, other analogous means, and their combinations.

As is also known to those skilled in the art, blocks, modules, circuits, and steps described in this documents may be embodied as electronic hardware, software, firmware, or combinations of hardware, software, and firmware. Whether specific functionality is implemented as hardware, software, firmware or a combination, this description is intended to cover the functionality. Some illustrative blocks, modules, circuits, and analogous elements described in this document may be implemented with a general purpose processor, a special purpose processor (such as an application specific integrated circuit-based processor), a programmable/configurable logic device, discrete logic, other discrete electronic hardware components, or combinations of such elements. A general purpose processor may be, for example, a microcontroller or a microprocessor. A processor may also be implemented as a combination of computing devices, for example, a plurality of microprocessors, one or more microprocessors in conjunction with one or more microcontrollers and/or one or more digital signal processors, or other analogous combination.

The instructions (machine executable code) corresponding to the method steps of this disclosure may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art. An exemplary storage medium is coupled to the processor such that the processor can read information from, and write information to, the storage medium. In an alternative, the storage medium may be integral to the processor. The instructions can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other kind of public or private network.

In this description, the focus was on one or more exemplary scenarios, but the techniques may be applicable to almost any variant of the exemplary scenarios and other scenarios.

The system and process features described throughout this document may be present individually, or in any combination or permutation, except where presence or absence of specific feature(s)/element(s)/limitation(s) is inherently required, explicitly indicated, or otherwise made clear from the context.

This document describes in detail the inventive apparatus, methods, and articles of manufacture for image capture and processing. This was done for illustration purposes only and, therefore, the foregoing description is not necessarily intended to limit the spirit and scope of the invention(s) described. Neither the specific embodiments of the invention(s) as a whole, nor those of its or their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A process of geolocation of at least one radio frequency (RF) transmission source using an antenna array, the process comprising steps of:
   locating a first plurality of scatterers within line-of-sight (LoS) of the antenna array using (1) Spatial Consistency algorithm, and (2) multilateration based on time difference of arrival (TDoA) of signals at the antenna array, wherein for each scatterer of the first plurality of scatterers coordinates and time of emission of reflections of transmissions from the at least one RF transmission source are estimated;
   locating the at least one RF transmission source based on the coordinates and the times of emission estimated for the first plurality of scatterers, thereby obtaining coordinates of the at least one RF transmission source; and
   providing the coordinates of the at least one RF transmission source, the step of providing comprising at least one of displaying, storing, and transmitting coordinates of the at least one RF transmission source.

2. A process of geolocation according to claim 1, wherein the antenna array is located non-line-of-sight (NLoS) to the at least one RF transmission source.

3. A process of geolocation according to claim 2, wherein at least one scatterer of the first plurality of scatterers is located non-line-of-sight to the at least one RF transmission source.

4. A process of geolocation according to claim 2, wherein at least two scatterers of the first plurality of scatterers are located non-line-of-sight to the at least one RF transmission source.

5. A process of geolocation according to claim 2, wherein each scatterer of the first plurality of scatterers is located non-line-of-sight to the at least one RF transmission source.

6. A process of geolocation according to claim 2, wherein the step of locating the at least one RF transmission source comprises iteratively determining coordinates and times of emission at a next set of scatterers within LoS of a previous set of scatterers until coordinates of the at least one RF transmission source are determined, wherein the step of iteratively determining comprises applying the Spatial Consistency algorithm and multiateration based on TDoA at each iteration, and wherein the multilateration is linearized.

7. A process of geolocation according to claim 6, wherein the step of locating the at least one RF transmission source comprises ensuring satisfaction of a non-singularity condition at said each iteration.

8. A process of geolocation according to claim 2, wherein the at least one transmission source consists of a single RF transmission source, and wherein geolocation bias errors are reduced or eliminated.

9. A process of geolocation according to claim 2, wherein the at least one transmission source comprises a plurality of RF transmission sources, and wherein coordinates of at least two RF transmission sources of the plurality of RF transmission sources are identified.

10. A process of geolocation of one or more transmission sources in a non-line-of-sight (NLoS) path from at least one receiver with a plurality of antenna elements, comprising:
    geolocating scatterers that are line-of-sight (LoS) to the plurality of antenna elements, wherein, for each scatterer that is LoS to the plurality of antenna elements, coordinates and time of emission of reflections of transmissions from the one or more transmission sources are estimated;
    after the step of geolocating the scatterers that are LoS to the plurality of antenna elements, using previously located scatterers as a virtual array to geolocate is next set of scatterers or the one or more transmission sources, the step of using the previously located scatterers being repeated until coordinates of the one or more transmission sources are obtained; and
    at least one of displaying, storing, and transmitting the coordinates.

11. A process of geolocation according to claim 10, wherein the step of geolocating the scatterers that are LoS comprises applying Spatial Consistency algorithm, performing multilateration based on time difference of arrival (TDoA) of signals, and selecting scatterers that satisfy a non singularity condition.

12. A process of geolocation of a transmission source in a strictly NLoS path to an observer by first geolocating scatterers that are LoS to the observer, wherein the geolocation process solves for the spatial coordinates of the scatterers and for time of arrival of signal at each scatterer; then using the spatial coordinates and times of arrival of the scatterers as a virtual array to systematically geolocate the next set of scatterers that are LoS to the virtual array, finding both the spatial coordinates and the times of arrival at each stage, and continuing the process until the one or more transmission sources are geolocated; and at least one of displaying, storing, and transmitting the spatial coordinates.

13. A process of geolocation according to claim 1, wherein
the multilateration of the step of locating the first plurality of scatterers comprises a step for applying a linearized multilateration algorithm that does not require the computationally intense process of solving non-linear equations and wherein the process of linearization is not an approximation.

14. A geolocation system comprising:
an antenna array comprising a plurality of antenna elements;
at least one receiver coupled to the antenna array and configured to receive signals from each antenna element of the array; and
at least one processor coupled to the at least one receiver to obtain information derived from the signals;
wherein the processor is configured to
locate a first plurality of scatterers within line-of-sight (LoS) of the antenna array by estimating coordinates and time of emission for each scatterer of a first plurality of scatterers that scatter a signal transmitted by at least one non-line-of-sight (NLoS) radio frequency (RF) transmission source, using Spatial Consistency algorithm, and using multilateration based on time difference of arrival (TDoA) of signals at the antenna array;
locate the at least one RF transmission source based on the coordinates and the times of emission estimated for the first plurality of scatterers, thereby obtaining coordinates of the at least one RF transmission source; and
provide the coordinates of the at least one RF transmission source by at least one of displaying, storing, and transmitting the coordinates of the at least one RF transmission source.

15. A system according to claim 14, wherein the at least one processor is configured to determine iteratively coordinates and times of emission at a next set of scatterers within LoS of a previous set of scatterers until the at least one RF transmission source is identified, by applying the Spatial Consistency algorithm and multiateration based on TDoA at each iteration, and wherein the multilateration is linearized.

16. A system according to claim 15, wherein the at least one processor is further configured to ensure satisfaction of a non-singularity condition at each iteration.

17. An article of manufacture comprising machine-readable storage medium with program code stored in the medium in a non-volatile manner, the program code, when executed by at least one processor of a system comprising an antenna array with a plurality of antenna elements, at least one receiver coupled to the antenna array, and at least one processor coupled to the at least one receiver, configures the system to:
locate a first plurality of scatterers within line-of-sight (LoS) of the antenna array, using (1) Spatial Consistency algorithm, and (2) multilateration based on time difference of arrival (TDoA) of signals at the antenna array, wherein for each scatterer of the first plurality of scatterers coordinates and time of emission of reflections of transmissions from at least one RF transmission source are estimated;
locate the at least one RF transmission source based on the coordinates and the times of emission estimated for the first plurality of scatterers, thereby obtaining coordinates of the at least one RF transmission source; and
provide the coordinates of the at least one RF transmission source by at least one of displaying, storing, and transmitting the coordinates of the at least one RF transmission source.

* * * * *

UNITED STATES PATENT AND TRADEMARK OFFICE
CERTIFICATE OF CORRECTION

| | | |
|---|---|---|
| PATENT NO. | : 9,453,905 B2 | Page 1 of 1 |
| APPLICATION NO. | : 13/738548 | |
| DATED | : September 27, 2016 | |
| INVENTOR(S) | : David Smith | |

It is certified that error appears in the above-identified patent and that said Letters Patent is hereby corrected as shown below:

In the Claims

Column 20, line 58, cancel "is" and replace the cancelled text with --a--;

Column 21, lines 2-3, cancel "non singularity" and replace the cancelled text with --non-singularity--.

Signed and Sealed this
Eighth Day of November, 2016

Michelle K. Lee
*Director of the United States Patent and Trademark Office*